United States Patent
Cheng et al.

(10) Patent No.: US 12,328,659 B2
(45) Date of Patent: Jun. 10, 2025

(54) MESH NETWORK SYSTEM AND MESH NETWORK RESOURCE ALLOCATION METHOD

(71) Applicant: Wistron NeWeb Corp., Hsinchu (TW)

(72) Inventors: Chui-Chu Cheng, Hsinchu (TW); Wang-Hsing Huang, Hsinchu (TW); Yi-An Chen, Hsinchu (TW); Tsung-Yu Ho, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 339 days.

(21) Appl. No.: 17/722,777

(22) Filed: Apr. 18, 2022

(65) Prior Publication Data
US 2023/0156563 A1 May 18, 2023

(30) Foreign Application Priority Data
Nov. 12, 2021 (TW) .................................. 110142161

(51) Int. Cl.
*H04W 40/24* (2009.01)
*H04W 28/16* (2009.01)
*H04W 84/18* (2009.01)

(52) U.S. Cl.
CPC ......... *H04W 40/248* (2013.01); *H04W 28/16* (2013.01); *H04W 84/18* (2013.01)

(58) Field of Classification Search
CPC .... H04L 45/70; H04W 40/22; H04W 40/248; H04W 28/16; H04W 84/18
See application file for complete search history.

(56) References Cited

U.S. PATENT DOCUMENTS

| | | | |
|---|---|---|---|
| 2011/0216667 A1* | 9/2011 | Zou | H04L 45/48 370/252 |
| 2012/0044837 A1* | 2/2012 | Ibanez Fernandez | H04L 45/48 370/256 |
| 2012/0230222 A1 | 9/2012 | Shaffer et al. | |
| 2016/0020967 A1* | 1/2016 | Thubert | H04J 3/16 370/252 |
| 2017/0177833 A1* | 6/2017 | Lewallen | G16H 20/30 |
| 2019/0140948 A1* | 5/2019 | Hui | H04L 47/24 |
| 2019/0174355 A1* | 6/2019 | Majmundar | H04L 47/20 |
| 2020/0169613 A1* | 5/2020 | King, V | H04L 67/148 |
| 2021/0160148 A1* | 5/2021 | Kolar | H04L 41/0663 |
| 2022/0086218 A1* | 3/2022 | Sabella | H04M 15/66 |
| 2022/0124584 A1* | 4/2022 | Han | H04W 36/0044 |
| 2022/0247643 A1* | 8/2022 | Dechene | H04L 45/64 |
| 2023/0020939 A1* | 1/2023 | Klein | H04L 67/10 |

FOREIGN PATENT DOCUMENTS

CN 112486668 A 3/2021

* cited by examiner

*Primary Examiner* — Oussama Roudani
(74) *Attorney, Agent, or Firm* — McClure, Qualey & Rodack, LLP

(57) ABSTRACT

A mesh network system and a mesh network resource allocation method are provided. The mesh network system includes a first router having a processor. The processor is used to detect a network architecture, according to the network architecture, designate a role of a second router as a transmitting device or a receiving device, and assign a work to the second router base on the role. After receiving the work assignment, the second router processes an event of the work and continuously monitors an activity related to the work.

16 Claims, 5 Drawing Sheets

200

```
┌─────────────────────────────────────────────┐
│ Detect a network architecture through a      │
│ processor 10                                 │──210
│ of a router AP1                              │
└─────────────────────────────────────────────┘
                      ↓
┌─────────────────────────────────────────────┐
│ According to the network architecture,       │
│ designate a role                             │
│ of a router AP2 to be a transmitting device  │──220
│ or a receiving                               │
│ device through the processor 10 of the       │
│ router AP1                                   │
└─────────────────────────────────────────────┘
                      ↓
┌─────────────────────────────────────────────┐
│ Assign work to router AP2 base on the role   │
│ through                                      │──230
│ the processor 10 of the router AP1           │
└─────────────────────────────────────────────┘
                      ↓
┌─────────────────────────────────────────────┐
│ Router AP2 processes an event of the work    │
│ and                                          │
│ continues to monitor an activity related to  │──240
│ the work after                               │
│ receiving the work assignment                │
└─────────────────────────────────────────────┘
```

FIG. 2

MESH NETWORK SYSTEM AND MESH NETWORK RESOURCE ALLOCATION METHOD

CROSS REFERENCE TO RELATED APPLICATIONS

This application claims priority of Taiwan Patent Application No. 110142161 filed on Nov. 12, 2021, the entirety of which is incorporated by reference herein.

BACKGROUND OF THE INVENTION

Field of the Invention

The disclosure generally relates to a mesh network, and more particularly, to a mesh network system and a mesh network resource allocation method.

Description of the Related Art

In a mesh network system, there are usually numerous routers, and each of which is used to connect more than two network devices to determine the transmission path of data packets (files, messages, network interactions, etc.). The network devices are, for example, desktop computers and printers. The router may have transmitting and receiving functions and can serve as a transmitting terminal and a receiving terminal at the same time. The data packets transmitted by the router acting as the transmitting terminal include many layers, wherein one of the layers contains information like data source, file content, file size, and destination internet address, etc. The router acting as the receiving terminal mainly reads the information in this layer, determines the priority of data transmission, finds the best transmission path, and sends the data to the specified address. A Wi-Fi router is a router with wireless network sharing function that is composed of a router and a wireless network. Therefore, through the wireless and/or wired network connections between routers, a mesh network system can be formed.

Hence, how to enhance the utilization rate of the overall mesh network system and improve the processing efficiency of the mesh network system without adding new equipment has been one of the challenges to be overcome.

BRIEF SUMMARY OF THE INVENTION

In an exemplary embodiment, the disclosure is directed to a mesh network system that includes a first router. The first router has a processor for detecting a network architecture, designating a role of a second router as a transmitting device or a receiving device according to the network architecture, and assigning a work to the second router base on the role. The second router processes an event of the work and continues to monitor an activity related to the work after receiving the work assignment.

In another exemplary embodiment, the disclosure is directed to a mesh network resource allocation method that includes: detecting a network architecture by a processor of a first router; designating a role of a second router as a transmitting device or a receiving device according to the network architecture; assigning a work to the second router base on the role; and the second router processing an event of the work and continuing to monitor an activity related to the work after receiving the work assignment.

In the mesh network system and the mesh network resource allocation method provided by the disclosure, the router, as a parent node, is able to detect the processor and memory resources required for each model or task, and is also able to obtain information on the process and memory resources available in each of the routers in the network architecture that can be used aside from transmission, and so the parent-node router is able to allocate the models or tasks base on these information. Thus, without having to add new equipment, the utilization rate of the mesh network system as a whole is increased, and the processing efficiency of the mesh network system is improved.

BRIEF DESCRIPTION OF DRAWINGS

The disclosure can be more fully understood by reading the subsequent detailed description and examples with references made to the accompanying drawings, wherein:

FIG. 2 is a flow chart of a mesh network resource allocation method according to an embodiment of the disclosure;

DETAILED DESCRIPTION OF THE INVENTION

Figure 1:
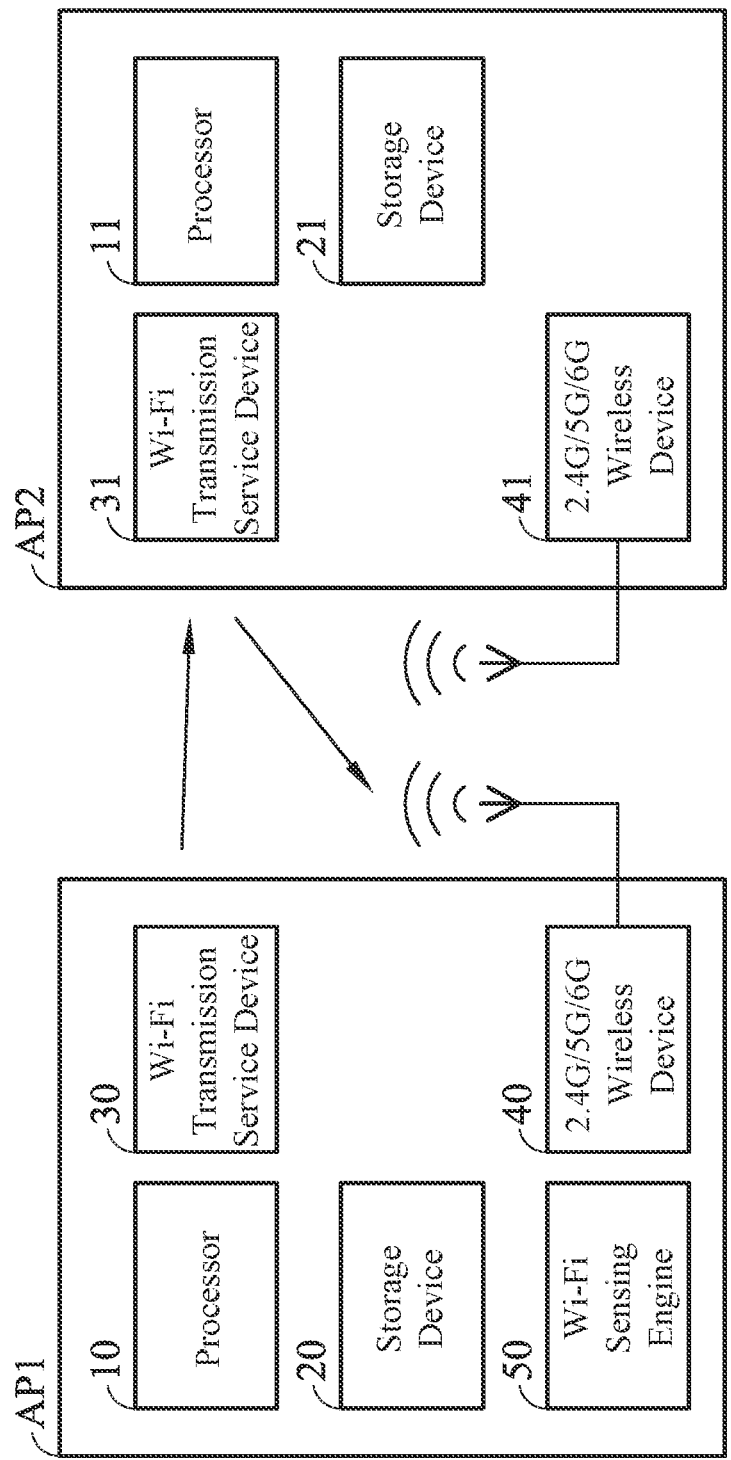
FIG. 1 is a block diagram of a mesh network system according to an embodiment of the disclosure.

In order to illustrate the purposes, features and advantages of the disclosure, the embodiments and figures of the disclosure are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, ordinal terms, such as "first", "second", and "third" used in the disclosure and claims, are used to modify the elements in the disclosure and claims, and are not used to indicate an order of priority, antecedent relationship, one element precedes another element, or the chronological order of execution of method steps, but is only used to distinguish elements with the same name.

Referring to FIG. 1, a mesh network system 100 includes a router AP1 and a router AP2. Each of the routers AP1, AP2 includes a Wi-Fi transmission service device 30, 31, a 2.4G/5G/6G wireless device 40, 41, a processor 10, 11, and a storage device 20, 21.

In one embodiment, each of the processors 10, 11 is composed by integrated circuits such as micro controllers, microprocessors, digital signal processors, application specific integrated circuits (ASIC), or logic circuits.

In one embodiment, each of the storage devices 20, 21 can be implemented using read-only memory, flash memory, floppy disk, hard disk, optical disc, compact disc, flash drive, tape, database accessible by internet, or any storage medium with similar functions.

In one embodiment, the router AP1 represents a receiving terminal, and the AP2 represents a transmitting terminal. In another embodiment, the router AP1 and the router AP2 may define themselves to be the transmitting terminal or the receiving terminal by their respective internal processors 10, 11.

In one embodiment, when the router AP1 is a parent node, the processor 10 of the router AP1 designates other routers in the network architecture, like the child node router AP2, to serve as a transmitting terminal or a receiving terminal.

In one embodiment, the router AP1 further includes a Wi-Fi sensing engine 50. The Wi-Fi sensing engine 50 may be realized by an artificial intelligence engine that is a known model, for example but not limited to, a convolutional neural network (CNN), a recurrent neural network (RNN), or other known models.

In general, a mesh network system typically uses a main router with a wired connection to a broadband modem, plus one or more routers like wireless routers or satellite routers that can be placed in different rooms or locations depending on the size of the building. The main router and the satellite routers form their own mesh Wi-Fi network to cover a wider area and therefore providing higher speed and better reliability than traditional Wi-Fi routers. To extend the wireless range, the mesh network contains more than two routers connecting with one another, and depending on the connecting signal, the mesh network can be connected in a topology of star, daisy chain, or tree. In the tree topology, there are parent nodes, and each of which connects with more than one child node. These nodes exchange topology request/response messages to each other, and eventually the parent nodes would obtain the placement relationship between all child nodes as well as the connection addresses of all child nodes. In other words, all of the routers are able to communicate with one another.

In one embodiment, at least one of the routers in the mesh network serves as a receiver (Rx) and/or a transmitter (Tx) for wireless sensing.

In some embodiments, the router AP1 and the router AP2 have the same components, and the communication link between the two routers AP1, AP2 is viewed as a network architecture.

In one embodiment, when the mesh network 100 includes a plurality of routers, the network architecture can be, but not limited to, a star topology network architecture, a daisy chain topology network architecture, a tree topology network architecture, or any other type of network architecture.

In one embodiment, when the router AP1 is a parent node, the processor 10 of the router AP1 is able to detect the type of the current network architecture.

Since the main function of the routers AP1, AP2 is to transmit signals, each of the routers AP1, AP2 has its own processor 10, 11 and storage device 20, 21, and when the routers AP1, AP2 are not busy, the processors 10, 11 and the storage devices 20, 21 can be allocated to process work related to an activity. For example, the work is human activity detection, and the activity includes human movement, gesture recognition, and biometric measurement.

Referring to FIG. 2, a mesh network resource allocation method 200 is illustrated to describe some parts of the embodiment.

In step 210, a network architecture is detected and/or monitored by a processor 10 of a router AP1.

For example, through transmitting and receiving packets, the router AP1 obtains information about the network architecture via the transmission of packets, and the network architecture is, for example, a star topology network architecture, a daisy chain topology network architecture, a tree topology network architecture, or any other type of network architecture.

In step 220, according to the network architecture, a role of a router AP2 is designated by the processor 10 of the router AP1 to be a transmitting device or a receiving device.

In one embodiment, the router AP1 is a parent node, and the router AP2 is a child node.

In one embodiment, when the router AP1 is a parent node, it can communicate and conduct transmission with the external network directly.

In step 230, through the processor 10 of the router AP1, work is assigned to the router AP2 base on the role.

In one embodiment, the role refers to being a transmitting terminal or a receiving terminal. In another embodiment, the role refers to being a parent node or a child node.

In one embodiment, when the router AP1 is a parent node, the processor 10 assigns work to the router AP2 or other routers base on their roles.

Figure 3A:
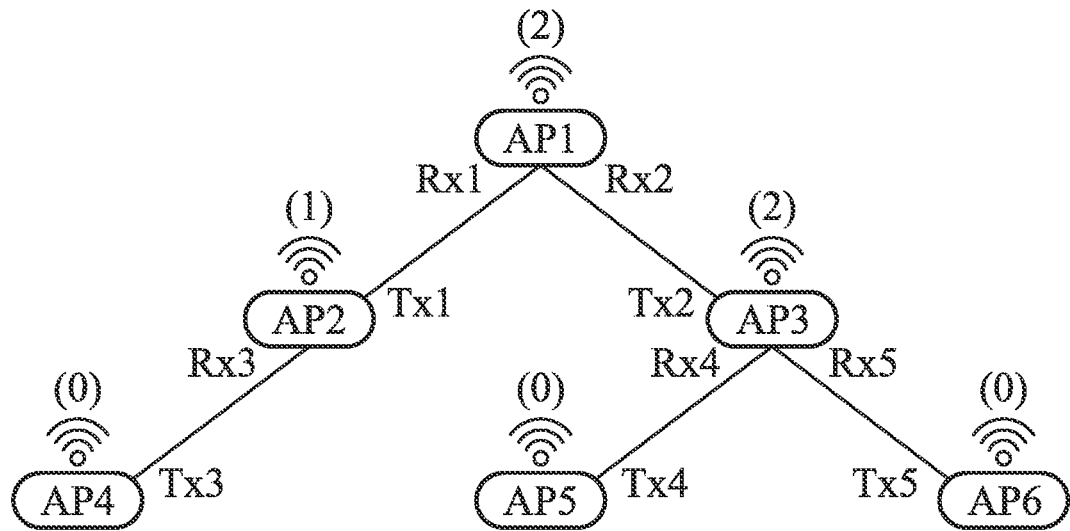
FIG. 3A and FIG. 3B are schematic diagrams of a mesh network resource allocation method according to an embodiment of the disclosure.

Referring to FIG. 3A, a mesh network has 6 routers AP1~AP6 and the resource of each router AP1~AP6 has not been allocated. The router AP1 is a parent node and serves the role of receiving terminal Rx1 to the router AP2, and the router AP2 serves the role of transmitting terminal Tx1 to the router AP1. The router AP1 serves the role of receiving terminal Rx2 to the router AP3, and the router AP3 serves the role of transmitting terminal Tx2 to the router AP1. The router AP4 serves the role of transmitting terminal Tx3 to the router AP2, and the router AP2 serves the role of receiving terminal Rx3 to the router AP4. The router AP3 serves the role of receiving terminal Rx4 to the router AP5, and the router AP5 serves the role of transmitting terminal Tx4 to the router AP3. The router AP3 serves the role of receiving terminal Rx5 to the router AP6, and the router AP6 serves the role of transmitting terminal Tx5 to the router AP3. In this embodiment, there are 5 work, and since work assignment is not performed to each router, the router AP1 ends up with 2 work to process (the numeral inside the brackets represents the number of work to be processed) whereas the router AP2 has 1 work to process, the router AP3 has 2 work to process, and other routers AP4~AP6 has no work to process.

In one embodiment, work refers to computation task or workload.

In one embodiment, both models and tasks require computation.

Figure 3B:
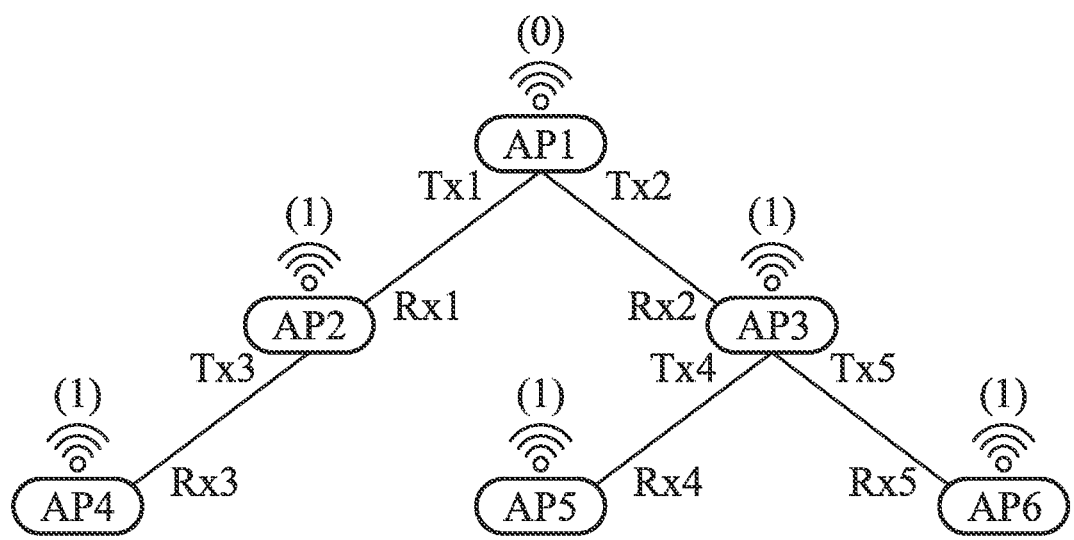

Referring to FIG. 3B, work assignment is performed to each router in the mesh network. The mesh network has 6 routers AP1~AP6 and the router AP1 is a parent node. The router AP1 serves the role of transmitting terminal Tx1 to the router AP2, and the router AP2 serves the role of receiving terminal Rx1 to the router AP1. The router AP1 serves the role of transmitting terminal Tx2 to the router AP3, and the router AP3 serves the role of receiving terminal Rx2 to the router AP1. The router AP4 serves the role of receiving terminal Rx3 to the router AP2, and the router AP2 serves the role of transmitting terminal Tx3 to the router AP4. The router AP3 serves the role of transmitting terminal Tx4 to the router AP5, and the router AP5 serves the role of receiving terminal Rx4 to the router AP3. The router AP3 serves the role of transmitting terminal Tx5 to the router AP6, and the router AP6 serves the role of receiving terminal Rx5 to the router AP3. It can be seen from above that the network architecture in FIG. 3B is the same as the network architecture in FIG. 3A.

In FIG. 3B, the router AP1 is a parent node and is used to detect a topology of the entire network architecture which is, in this embodiment, a tree topology structure. The router AP1 assigns work to each of the routers AP1~AP6 to share the workload. In this embodiment, there are 5 work, and the router AP1 assigns work base on predefined rules and hardware loading of each router AP1~AP6. The hardware loading is, for example, a memory status and/or a processor status of each router AP1~AP6. In this embodiment, the router AP1 assigns 1 work to the router AP2 (the numeral in the brackets represents the number of work to be processed), 1 work to the router AP3, 1 work to the router AP4, 1 work to the router AP5, and 1 work to the router AP6.

Hence, based on the predefined rules or the hardware loading of each router AP1~AP6, the router AP1 is able to assign work to each router AP1~AP6 to enhance processing efficiency. In step 240, after the router AP2 receives the work assignment, the router AP2 processes an event of the work and continues to monitor an activity related to the work.

In one embodiment, when the router AP2 receives the work assignment, the processor 11 of the router AP2 is used to process the event that needs to be computed for the work, like convert time domain to frequency, filter noise, analyze the received signal waveform, and capture characteristics of the signal waveform such as signal change, phase change, etc., and base on the captured signal characteristics, the router AP2 determines an event to be triggered by the work, such as sending a message to a mobile device, and continues to monitor an activity related to the work.

In this embodiment, how the routers AP3~AP6 detect and process the events is similar to that of the router AP2, and the difference lies in that the event which each of the routers AP3~AP6 detects and processes may not be the same.

In one embodiment, when the processor 10 detects a change in the network architecture, the processor 10 dynamically adjusts the work assignment according to the changed network architecture.

In one embodiment, the router AP1 assigns work to the router AP2, and the work includes a computational workload.

Therefore, by the router AP1 assigning work to each of the routers AP1~AP6, 5 routers AP2~AP6 in this embodiment are processing and detecting the work and activity assigned to them, and so the loading on each router is balanced whilst the processing efficiency of the network architecture as a whole is increased. In one embodiment, the work refers to a task. In one embodiment, each task is preferably assigned to each child node AP2~AP6 because in a mesh network, a child node is succession of a parent node, and in terms of sharing workload, the distribution of resources this way is always better than not assigning work at all. Generally, the parent node has more communicative matters to process than the child node in the mesh network. Also, this way saves time, that is if each router AP1~AP6 needs to monitor resource usage at all times, or if the tasks are sequential, there would be time delay issues because completed tasks must be transmitted to next station for process, and not every router can do such monitoring. Hence, tasks can be assigned by this simple method.

In one embodiment, the processor 10 detects whether other router has joined the network architecture and detects whether any router has left the network architecture. When the router AP1 is a parent node, the router AP1 updates the information about the current network architecture in real-time, so as to redistribute loadings assigned to each router.

In one embodiment, the processor assigns a plurality of tasks to all of the routers AP1~AP6 base on the processor status and the memory status of each router AP1~AP6 in the network architecture. In other words, the processor 10 is able to determine the processor resource and the memory resource required by each task and to obtain the processor resource and the memory resource available for use and excluding transmission-required-resources in each router AP1~AP6, and thereby the processor 10 is able to assign the tasks base on these information.

In one embodiment, each router accepts at least one task. For example, the router AP1 accepts one task (a), and the router AP2 accepts two tasks (a, b), namely, task (a) and task (b).

Figure 4:
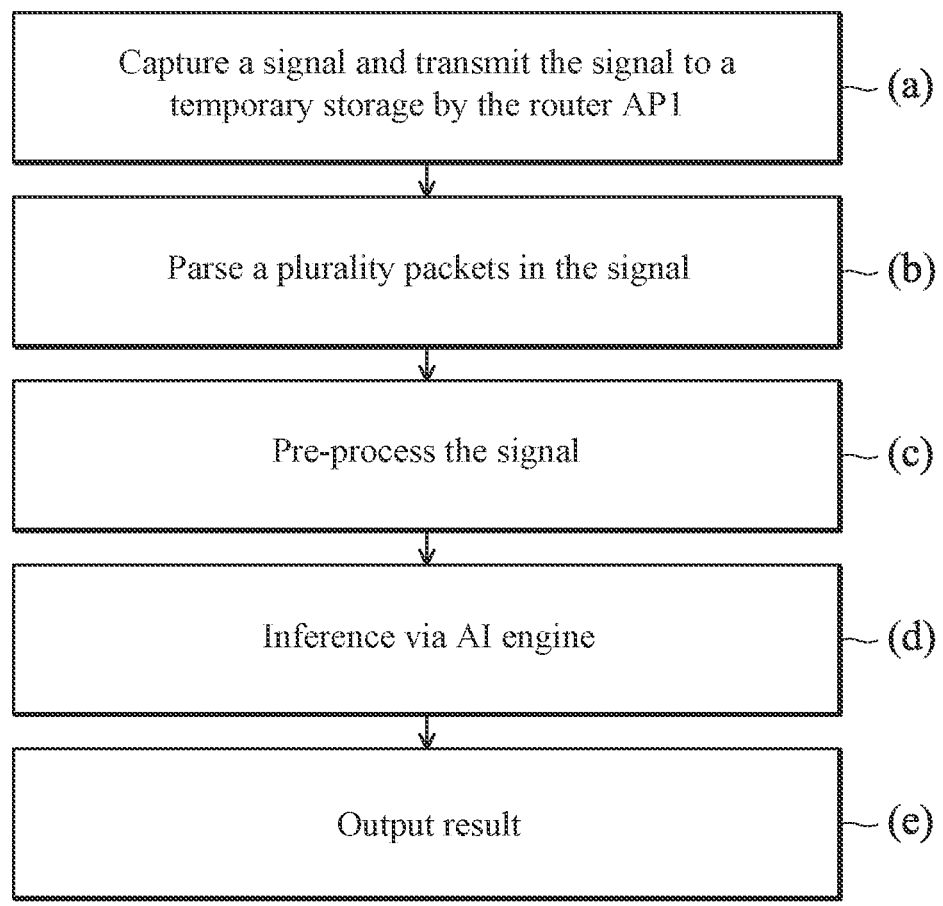
FIG. 4 is a flow chart illustrating procedural steps of a task according to an embodiment of the disclosure.

Referring to FIG. 4, the contents or steps of the tasks include: (a) the router AP1 capturing a signal and transmitting the signal to a temporary storage such as the storage device 20, wherein the storage device 20 can be a memory; (b) parsing a plurality packets in the signal; (c) pre-processing the signal by pre-processing the parsed packet data; (d) inferencing via an artificial intelligence engine (AI engine) by using the pre-processed signal; and (e) outputting result by the AI engine.

Figure 5:
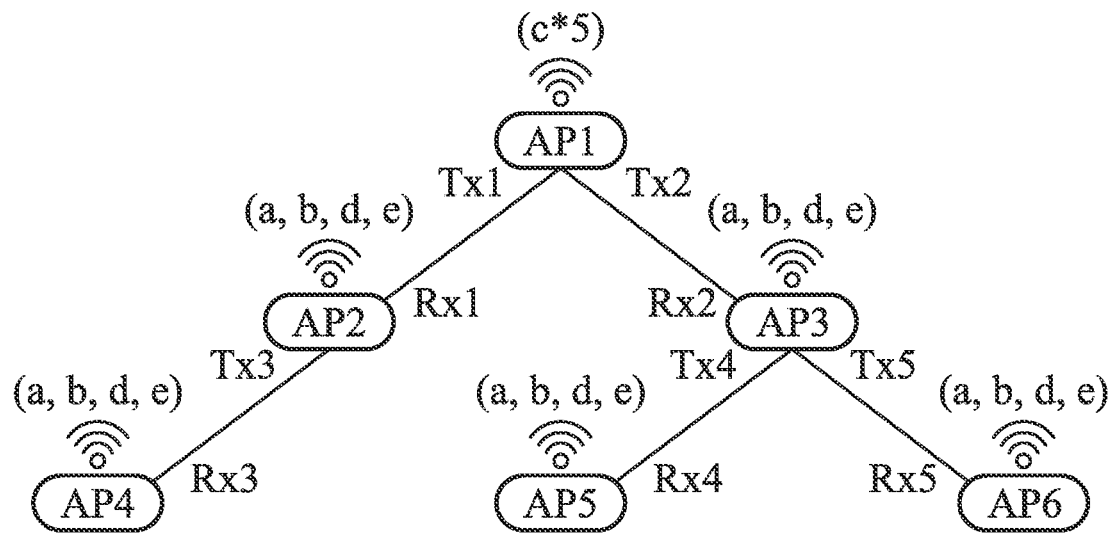
FIG. 5 is a schematic diagram of routers with assigned tasks according to an embodiment of the disclosure.

In one embodiment, the router AP1 assigns tasks and each of the routers AP1~AP6 executes its own tasks. Referring to FIG. 5, each router executes their assigned tasks. In this embodiment, there are 5 tasks to be processed, and the router AP1 is responsible for (c) pre-processing signal of these 5 tasks while the routers AP2~AP6 execute their own tasks (a, b, d, e). For example, the router AP2 executes (a) capturing a signal and transmitting the signal to a temporary storage/buffer, (b) parsing a plurality of packets in the signal, (d) inferencing events by AI engine, and (e) outputting result of the first task; the router AP3 executes (a) capturing a signal and transmitting the signal to a temporary storage/buffer, (b) parsing a plurality of packets of the signal, (d) inferencing events by AI engine, and (e) outputting result of the second task; the router AP4 executes the steps of (a) capturing a signal and transmitting the signal to a buffer, (b) parsing a plurality of packets, (d) inferencing events by AI engine, and (e) outputting result of the third task; the router AP5 executes the steps of (a) capturing a signal and transmitting the signal to a buffer, (b) parsing a plurality of packets, (d) inferencing events by AI engine, and (e) outputting result of the fourth task; and for the fifth task, the router AP6 executes the steps of (a) capturing a signal and transmitting the signal to a buffer, (b) parsing a plurality of packets, (d) inferencing events by AI engine, and (e) outputting result.

When the tasks are assigned by the router AP1, since the steps (a)~(e) of the tasks are sequential, each of the tasks needs to be performed according to the steps (a)~(e).

For example, for the fourth task, the router AP5 executes step (a) capturing a signal and transmitting the signal to a temporary storage and step (b) parsing a plurality of packets in the signal before transmitting the result of step (b) to the router AP1 which is responsible for step (c) pre-processing signal of the fourth task. After completing step (c), the router AP1 transmits the result of step (c) to the router AP5, and the router AP5 subsequently executes step (d) inferencing events by AI engine and step (e) outputting result.

Thus, the processor 10 assigns a plurality of tasks to all routers in the network architecture according to the processor status and the memory status of each router AP1~AP6. When the processor 10 detects the processor status of one of the routers AP2~AP6 is higher than a processor performance loading or the memory status of one of the routers AP2~AP6 is higher than a memory capacity loading, like when the memory status of router AP2 is 95% in usage which is over the memory capacity loading of 40%, the router AP1 does not assign any task to the router AP2.

In one embodiment, the processor 10 assigns a plurality of models to all routers AP1~AP6 in the network architecture according to the processor status and the memory status of each router AP1~AP6.

In one embodiment, each router accepts at least one model such as model A and continues to monitor for the triggering of at least one event corresponding to the at least one model.

In one embodiment, the models are artificial intelligence models.

For example, the plurality of models are models that have been trained by existing neural network and are respectively used to detect intrusion, breathing, and falling. A model A for intrusion detection refers to a model that has been trained with an existing method to determine an intruder has entered the house when user is at work, and ultimately relays the intrusion message to a mobile device of the user. A model B for breathing detection refers to a model that has been trained with an existing method to detect chest movements for determining whether the user is breathing. A model C for falling detection refers to a model that has been trained with an existing method to detect human posture for determining whether the user fell down.

Figure 6:
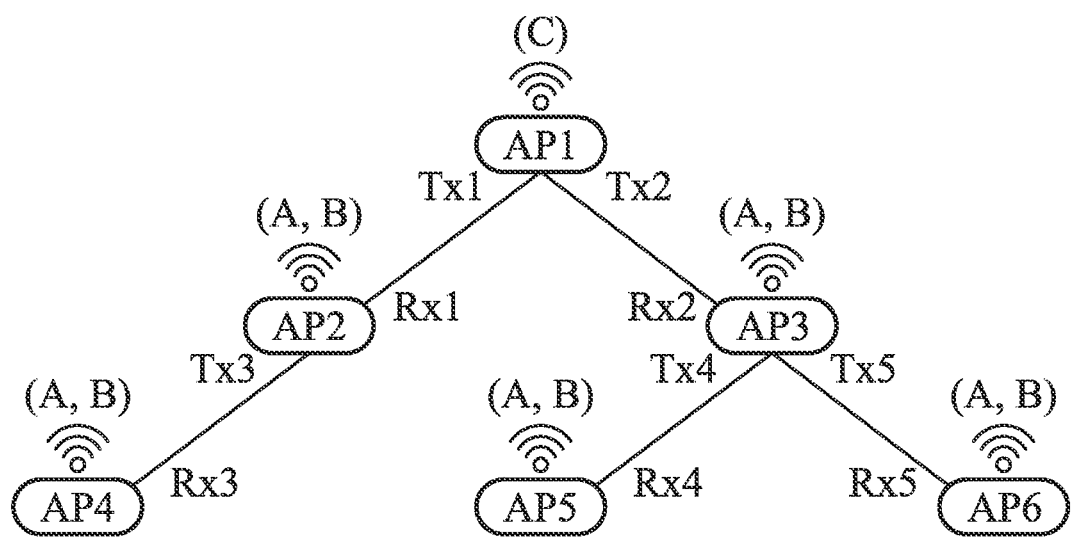
FIG. 6 is a schematic diagram of routers with assigned models for computation according to an embodiment of the disclosure.

Referring to FIG. 6, the routers AP1~AP6 are assigned with models for computation. In FIG. 6, the processor 10 of the router AP1 can detect in advance the remaining processor resources and memory resources of each router AP1~AP6, and assign the models base on these information. For example, the router AP1 is responsible for executing the model C for continuously detecting whether someone fell down in the space, and the routers AP2~AP6 are each responsible for executing the model A or the model B for continuously detecting whether there are intruders in the room or for continuously detecting for signs of breathing, respectively. However, these activities are merely exemplary, and the applied models are trained according to the required detection functionality.

Thus, the processor 10 assigns the plurality of models to the routers AP1~AP6 base on the processor status and the memory status of each router AP1~AP6. There is no sequential issue involved with such assignment, and each router AP1~AP6 just needs to continuously detect whether an event matched the assigned model has happened.

In addition, when the processor 10 detects a change in the network architecture, the processor 10 dynamically adjusts the assignment, of the models or the tasks, according to the changed network architecture.

In the mesh network system and the mesh network resource allocation method shown in the present disclosure, the router (being a parent node, for example) is able to detect the necessary processor resource and memory resource required by each model or task, and is also able to obtain the available processor resource and memory resource left in each router less what is needed for signal transmission, and so the parent-node router can assign models or tasks base on these information. Therefore, the usage rate of the mesh network system as a whole is increased, and the processing efficiency of the mesh network system is enhanced, without having to add new equipment.

The method, or particular form or a part thereof, can exist in a form of program codes that can be stored in a physical medium such as floppy disc, optical disc, hard drive, or any other machine readable, like computer readable, storage medium, and/or in a computer program product to which its external form is not limited. When the program code is loaded and executed by the machine/computer, the machine became a device practicing the present disclosure. The program code can also be transmitted by some transmitting media such as electric wire, electrical cable, optical fiber, or any transmission type, and when the program code is received, loaded, and executed by the machine/computer, the machine became a device practicing the present disclosure. When a general-purpose processing unit is used for implementation, the program code combines with the processing unit to provide an operation similar to a unique device applying specific logic circuits.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A mesh network system, comprising:
a first router, comprising:
a processor, for detecting a network architecture, designating a role of a second router as a transmitting device or a receiving device according to the network architecture, and assigning work to the second router based on the role;
wherein the second router processes an event of the work and continues to monitor an activity related to the work after receiving the work assignment;
wherein the first router is a parent node, the second router is a child node;
wherein the processor assigns a plurality of models to all routers in the network architecture based on a processor status and a memory status of each of the routers, and each of the routers accepts at least one of the plurality of models and continues to monitor whether at least one event corresponding to the at least one model has been triggered;
wherein the plurality of models are different artificial intelligence models.
2. The mesh network system as claimed in claim 1, wherein the work comprises a computational workload, and the first router communicates with an external network directly.

3. The mesh network system as claimed in claim 1, wherein the processor detects whether a third router has joined the network architecture and detects whether the second router has left the network architecture.

4. The mesh network system as claimed in claim 1,
wherein the processor assigns a plurality of tasks to all routers except for the first router in the network architecture based on a processor status and a memory status of each of the routers;
each of the routers except for the first router accepts at least one of the plurality of tasks, and the first router doesn't process any of the plurality of tasks, after the first router has assigned the plurality of tasks.

5. The mesh network system as claimed in claim 4, wherein the plurality of tasks comprise (a) capturing a signal and transmitting the signal to a temporary storage, (b) parsing a plurality of packets in the signal, (c) pre-processing the signal, (d) inferencing via an artificial intelligence engine, and (e) outputting a result;
wherein the plurality of tasks are sequentially performed according to steps (a)-(e).

6. The mesh network system as claimed in claim 4, wherein, when the processor status of the second router exceeds a processor performance loading, or when the memory status of the second router exceeds a memory capacity loading, the first router does not assign any of the plurality of tasks to the second router.

7. The mesh network system as claimed in claim 1, wherein, when the processor detects a change in the network architecture, the processor dynamically adjusts the work assignment according to the changed network architecture.

8. The mesh network system as claimed in claim 1, wherein the work is human activity detection, and the activity comprises human movement, gesture recognition, and biometric measurement.

9. A mesh network resource allocation method comprising:
detecting a network architecture by a processor of a first router;
designating a role of a second router as a transmitting device or a receiving device according to the network architecture;
assigning work to the second router based on the role;
the second router processing an event of the work and continuing to monitor an activity related to the work after receiving the work assignment; and
assigning a plurality of models to all routers in the network architecture based on a processor status and a memory status of each of the routers, wherein each of the routers accepts at least one of the plurality of models and continues to monitor whether at least one event corresponding to the at least one model has been triggered;
wherein the first router is a parent node, the second router is a child node;
wherein the plurality of models are different artificial intelligence models.

10. The mesh network resource allocation method as claimed in claim 9, wherein the work comprises a computational workload, and the first router communicates with an external network directly.

11. The mesh network resource allocation method as claimed in claim 9, wherein the processor detects whether a third router has joined the network architecture and detects whether the second router has left the network architecture.

12. The mesh network resource allocation method as claimed in claim 9, further comprising:
assigning a plurality of tasks to all routers except for the first router in the network architecture based on a processor status and a memory status of each of the routers, wherein each of the routers except for the first router accepts at least one of the plurality of tasks, and the first router doesn't process any of the plurality of tasks, after the first router has assigned the plurality of tasks.

13. The mesh network resource allocation method as claimed in claim 12, wherein the plurality of tasks comprise (a) capturing a signal and transmitting the signal to a temporary storage, (b) parsing a plurality of packets in the signal, (c) pre-processing the signal, (d) inferencing via an artificial intelligence engine, and (e) outputting a result;
wherein the plurality of tasks are sequentially performed according to steps (a)-(e).

14. The mesh network resource allocation method as claimed in claim 12, further comprising:
when the processor determines the processor status of the second router exceeds a processor performance loading, or the memory status of the second router exceeds a memory capacity loading, the first router not assigning any of the plurality of tasks to the second router.

15. The mesh network resource allocation method as claimed in claim 9, further comprising:
when the processor detects a change in the network architecture, the processor dynamically adjusting the work assignment according to the changed network architecture.

16. The mesh network resource allocation method as claimed in claim 9, wherein the work is human activity detection, the activity comprises human movement, gesture recognition, and biometric measurement.

* * * * *